US009081478B2

(12) United States Patent
Pecorilli et al.

(10) Patent No.: US 9,081,478 B2
(45) Date of Patent: Jul. 14, 2015

(54) UNIFIED PROCESS MANAGEMENT SOFTWARE AND METHOD

(76) Inventors: Patrick Pecorilli, Blainville (CA); Harold Lebrun, Mascouche (CA); Bruno Gauthier, Methuen, MA (US)

(*) Notice: Subject to any disclaimer, the term of this patent is extended or adjusted under 35 U.S.C. 154(b) by 408 days.

(21) Appl. No.: 13/581,389

(22) PCT Filed: Feb. 25, 2011

(86) PCT No.: PCT/CA2011/000231
§ 371 (c)(1),
(2), (4) Date: Jan. 10, 2013

(87) PCT Pub. No.: WO2011/103673
PCT Pub. Date: Sep. 1, 2011

(65) Prior Publication Data
US 2013/0104048 A1  Apr. 25, 2013

Related U.S. Application Data

(60) Provisional application No. 61/308,191, filed on Feb. 25, 2010.

(51) Int. Cl.
*G06F 3/0481* (2013.01)
*G06Q 10/10* (2012.01)

(52) U.S. Cl.
CPC ............ *G06F 3/04817* (2013.01); *G06Q 10/10* (2013.01)

(58) Field of Classification Search
CPC .................................................. G06F 3/04817

USPC .......................................................... 715/740
See application file for complete search history.

(56) References Cited

U.S. PATENT DOCUMENTS

| 5,576,946 A | 11/1996 | Bender et al. |
| 7,065,705 B1 * | 6/2006 | Wang et al. ................... 715/209 |
| 2003/0158832 A1 * | 8/2003 | Sijacic et al. ..................... 707/1 |

OTHER PUBLICATIONS

National Instruments, Getting Results with ComponentWorks Automation Symbols Part No. 322063A-01, Jul. 1998 Edition, Austin Texas USA, http://www.ni.com/pdf/manuals/322063a.pdf.

* cited by examiner

*Primary Examiner* — Andrea Leggett
(74) *Attorney, Agent, or Firm* — Twentyseven Patents, LLC; Gustavo Marin

(57) ABSTRACT

A unified process management system for creating and executing processes from a remote computer, the system comprising a central server having an associated process database, a process builder and a process player tools located on the remote computer. The process builder tool the process builder tool is configured so as to allow a user to create or edit a process by linking smart icons having associated functionalities using directional links and storing the created process in the process database of the central server. The process player tool is configured so as to allow a user to execute a process selected process from a list of available processes in the database.

18 Claims, 7 Drawing Sheets

UNIFIED PROCESS MANAGEMENT SOFTWARE AND METHOD

CROSS-REFERENCE TO RELATED APPLICATIONS

This application claims the benefits of U.S. provisional patent application No. 61/308,191 filed on Feb. 25, 2010, which is herein incorporated by reference.

TECHNICAL FIELD

The present disclosure relates to a unified process management system and method.

BACKGROUND

Process management is imperative for any enterprise producing services and/or goods. So naturally, processes are created, documented, controlled and executed is every business, every day. Unless an enterprise has invested heavily in a software group to create a custom solution, most businesses manage processes using off-the-shelf, disparate solutions. Some processes are paper-based, some are documented on a word-processor or in a spreadsheet and those processes are executed either manually as a checked-list, some semi-automatically and others on a dedicated station with a dedicated software suite. The creation, revision, maintenance and execution of all those processes require specific skills on a plurality of software tools.

The first attempt at automating business processes began with hardwiring in software the formal process often by programmers not familiar with the working environment of those processes. The end-user simply executed the process, as is, on a local computer. This resulted in a rigid and slow iterative method to implement and improve the automated processes and users not skilled in the art of programming had to rely on a team of programmers to improve or modify the automation. Because of its complexity, this was applied mainly to repetitive actions in manufacturing stations or in administrative processes. The user interface was often on a terminal presented as a form with empty fields to be filled.

The second step came with the improvement of the computer graphic interface. It was then possible to divide a process into smaller reusable blocs represented by an icon. Those icons were still in fact small fixed pieces of executable code not easily upgradable by the user. Color information was added for pass/fail or critical decision step to guide the user. A sequencer was added along with the ability to drive external devices behind the icon to lead to current test station designs. Mechanisms were included to share information within processes by the use of local and global variables as described. Later, process management was introduced as graphical work elements linked together including data repository and actor selection for performing the work element.

However, the user, although better served by a convivial interface, is still disconnected from the implementation as the icons hide significant amount of specialized programming even if the programming is via graphic icons like, for example, in Labview™ or in similar systems.

Accordingly, there is a need for a system and method giving users the ability of creating, editing, executing and maintaining management processes without the need of programmers, compilers or other specialized tools.

SUMMARY

The present disclosure proposes a unified process management system for creating and executing processes from a remote computer, the system comprising:

a central server having an associated process database;
a process builder tool located on the remote computer, the process builder being configured so as to allow a user to create or edit a process by linking smart icons having associated functionalities using directional links and storing the created process in the process database;
a process player tool located on the remote computer, the process player tool being configured so as to allow the user to execute a process selected process from a list of available processes in the database;

wherein the remote computer is configured so as to communicate with the central server.

The present disclosure also proposes method of creating a process using a process building tool having a graphic user interface with a plurality of icons and directional links, comprising the steps of:

a. positioning a start icon in the graphic user interface;
b. selecting a smart icon from the plurality of icons, each icon having an associated functionality and parameters;
c. positioning the selected icon in the graphic user interface;
d. linking the elected icon to at least one previously positioned icon using the directional links, the directional links representing the order in which the functionalities of the icons are to be performed;
e. setting the parameters of the selected icon;
f. if there are other icons to be added, returning to step b.;
g. positioning a end icon in the graphic user interface; and
h. linking the end icon to at least one previously positioned icon using the directional links wherein one or more paths created by the linking of the start icon, selected icons and end icon constitute the process.

BRIEF DESCRIPTION OF THE DRAWINGS

The above and other aspects, features and advantages of the invention will be better understood by reading the following more detailed description of the disclosure in conjunction with the following drawing, wherein.

DEFINITION

The detailed description and figures refer to the following term which is herein defined but is not meant to be limited to:

Process: a series of steps, actions or operations in an enterprise context, which include manufacturing, assembling, controlling, testing, inspecting, quality control, displaying, capturing, transferring, transporting, etc.

DETAILED DESCRIPTION OF ILLUSTRATIVE EMBODIMENT

Generally stated, the non-limitative illustrative embodiment provides a unified process management system and method providing a unified way to manage, create, revise and execute processes related to an enterprise. The unified process management system does so using a process directory structure having different levels of processes that are accessible based on user-access rights on a main central server, a central server that distributes and manages all processes and a uniform code-less graphical method of visualizing, creating, editing and running a process.

As such, the unified process management system provides the ability to run several processes in parallel as threads, the unified treatment of both manual checked-box type processes and fully automated test-station based processes and the ability to easily share resources or costly equipment between stations running processes via the central server.

Figure 1:
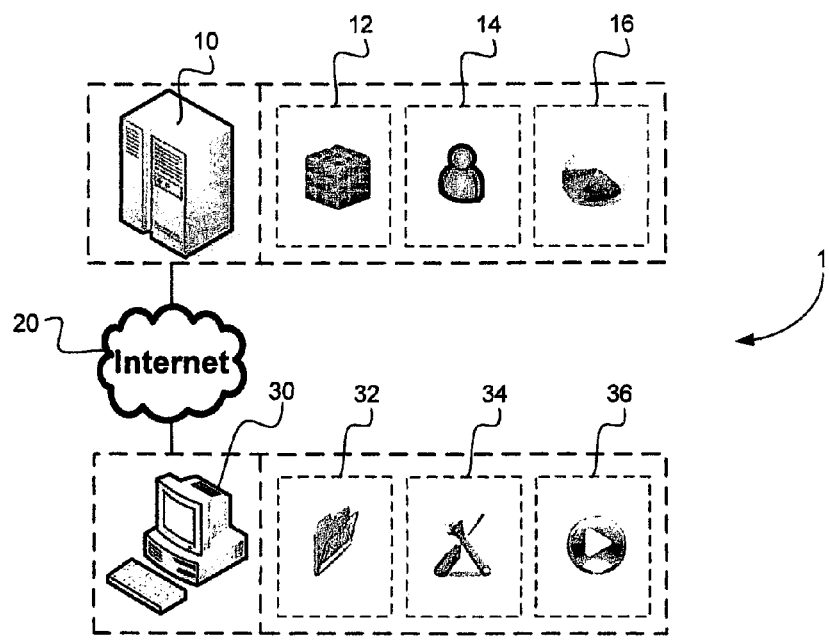
FIG. 1 shows a block diagram of the unified process management system in accordance with a non-limitative illustrative embodiment of the present disclosure.

Referring to FIG. 1, the unified process management system (1) is composed of a central server (10) and one or more remote computer (30) connected together via a network (20), for example an Internet connection such as Ethernet (broadband, high-speed), wireless WiFi, cable Internet, satellite connection, cellular or satellite network, etc.

The central server (10) includes, in a process database (12), processes available to the various users having accounts on the unified process management system (1). The processes can be initially provided with the unified process management system (1) and/or created by users having the proper access rights. The process database (12) includes a process directory that classifies processes according to various parameters. The central server (10) also includes remotely-accessible tools such as an account manager tool (14) and a reporting tool (16).

The remote computer (30) includes local tools such as a process directory tool (32), a process builder tool (34) and a process player tool (36) that are used to interact with the central server (10). The process directory tool (32) displays for each user having an account on the unified process management system (1), using the process directory of the process database (12), the list of processes that are accessible for that user. The process directory tool (32) also allows the user to create new process directory entries or edit existing ones. The process builder tool (34) allows users to locally create and/or edit processes on the remote computer (30) and remotely store the newly created or edited processes in the process database (12) of the central server (10). As for the process player tool (36), it allows the user to retrieve a process from the process database (12) of the central server (10) and run it locally on the remote computer (30).

It is to be understood that the central server (10) and the one or more remote computer (30) each comprise a processor and associated memory, as well as input/output interfaces in order to store and execute the various tools (14, 16, 32, 34, 36), communicate with each other and with the user. It is further to be understood that the tools (14, 16, 32, 34, 36) may be in the form of software installed and executed on respective central server (tools (14 and 16)) and one or more remote computer (tools (32, 34 and 36)).

Process Directory Tool

Figure 2:
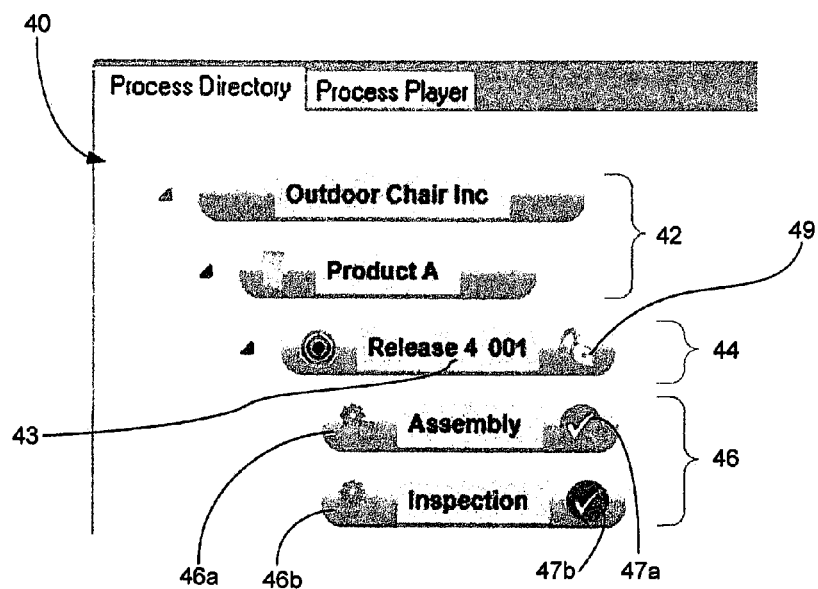
FIG. 2 shows an example of a process directory structure as displayed by the process directory tool.

Referring to FIG. 2, the process directory tool (32) (see FIG. 1) is used to classify processes in a directory structure through a graphic user interface (40) using a set of labels such as enterprise name, department, product, task, external contractors, etc. Three main types of labels are available at the creation of a new process directory: organization, version and process.

The organization labels (42), which are generally at the top of the hierarchical directory structure, are used to create the organizational structure of the enterprise.

The version labels (44), which are generally in the middle of the hierarchical directory structure, are used to track the evolution of the processes using a counter (43). In the illustrative embodiment, the counter (43) is a numerical counter that auto-increments each time a new version of a process is created and/or copy/pasted under a same directory structure.

The process labels (46), which are generally in the bottom of the hierarchical directory structure, are used to name the various processes. Processes higher up in the hierarchical directory structure indicate the order in which they should be performed. For example, the assembly process (46a) should be performed prior to the inspection process (46b). Each process label (46a, 46b) includes a mode indicator (47a, 47b) indicating if the process identified by the label (46a, 46b) is available to be run by the process player tool (36). The indicator (47a, 47b) may use color, e.g. green for available, red for unavailable, or a symbol, e.g. check for available, x for unavailable, to indicate availability of the process. The process directory tool (32) uses an event distribution mechanism in cooperation with the central server (10) in order to allow multiple users to simultaneously work on a process without running the risk of corrupting the process file.

When a user selects a process for editing, a request is sent to the central server (10) to reserve the process. The central server (10) then makes the process unavailable and the request is conveyed to the other users by setting the mode indicator (47a or 47b) of the process label (46a or 46b) of the process so as to indicate that the process is unavailable (for example by setting the mode indicator (47a or 47b) to red). When the user is done with the process and saves its work, the central server (10) makes the process available again and sets the appropriate mode indicator (47a or 47b) such as to indicate that the process is available (for example by setting the mode indicator (47a or 47b) to green).

Furthermore, a series of processes may be locked, preventing users from editing or deleting the locked processes, unless unlocked by a user having sufficient access rights. The locked or unlocked status of the processes may be indicated using, for example, a lock indicator (49).

Process Builder Tool

Figure 3:
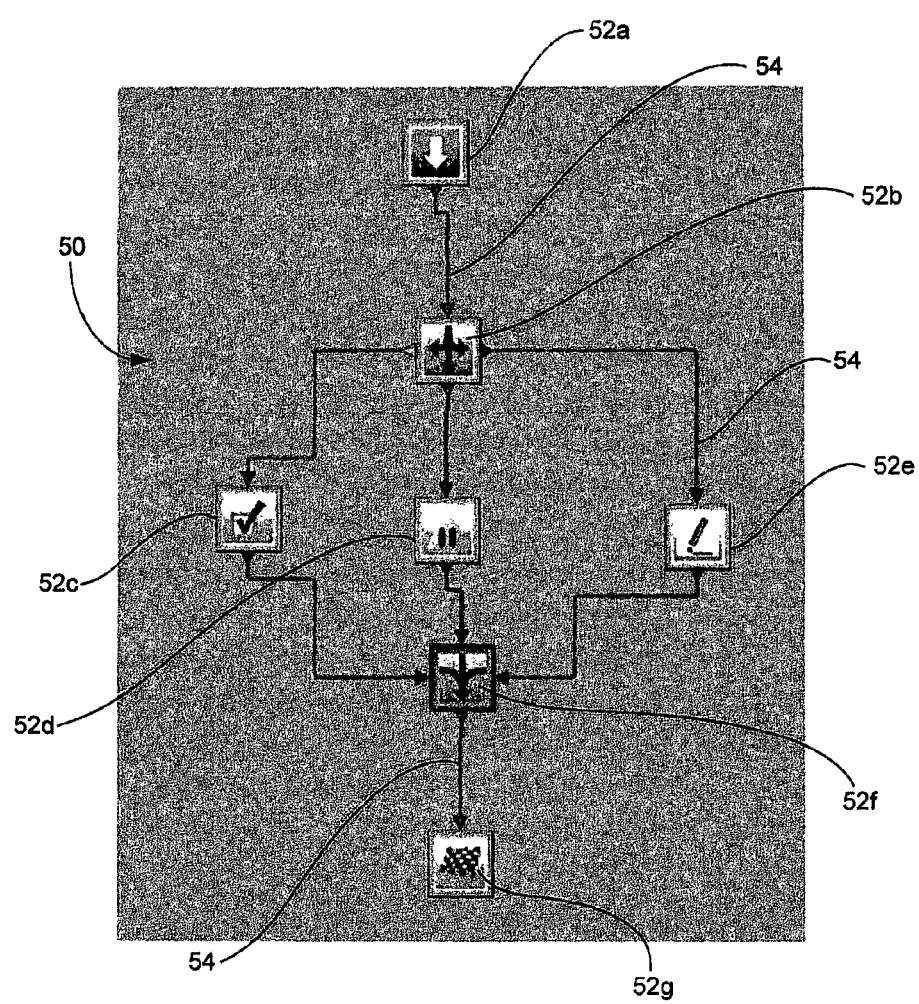
FIG. 3 shows a graphical representation of a process in accordance with a non-limitative illustrative embodiment of the present disclosure.

Referring to FIG. 3, the process builder tool (34) (see FIG. 1) is used to create processes through a graphic user interface (50) in which a set of smart icons (52) are interconnected using directional links (54). A process starts with a start icon (52a) and ends with an end icon (52g). Each smart icon (52) possesses unique characteristics and functionalities that can be adapted to specific requirements by setting a number of associated parameters. The functionalities may be steps that are to be executed by the user or automated steps executed by designated equipment. Each type of smart icon is advantageously illustrated with a graphic representative of its general functionalities. As for the directional links (54), they are used to indicate the workflow of the various icons (52), i.e. in which order the corresponding steps, actions, etc., composing the process are to be executed.

Figure 4:
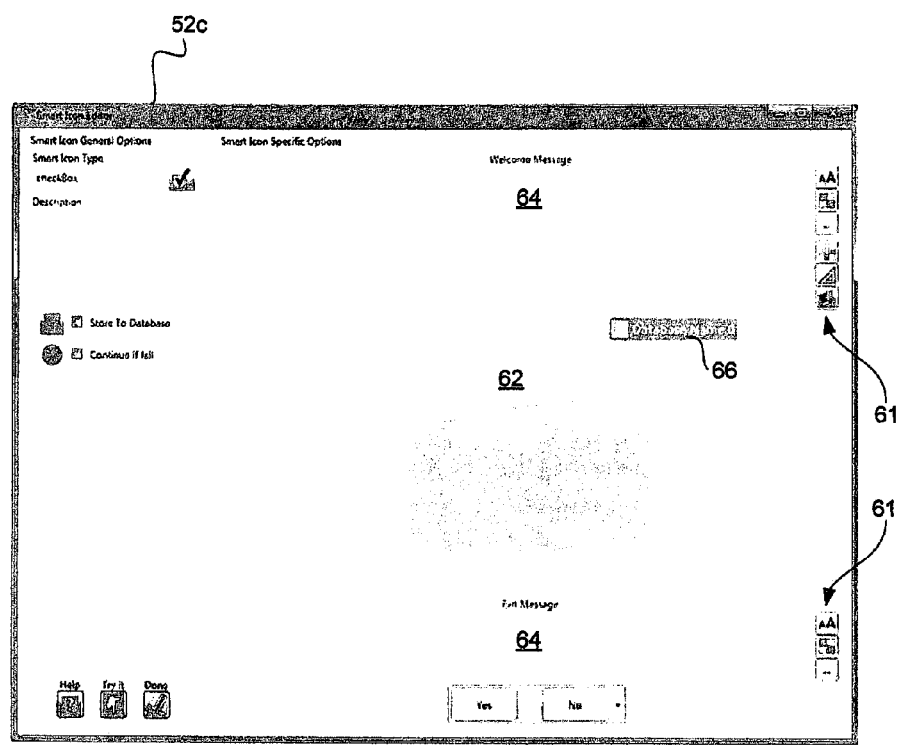
FIG. 4 shows a graphic user interface for the editing of a check box smart icon using the process builder tool.
Figure 5:
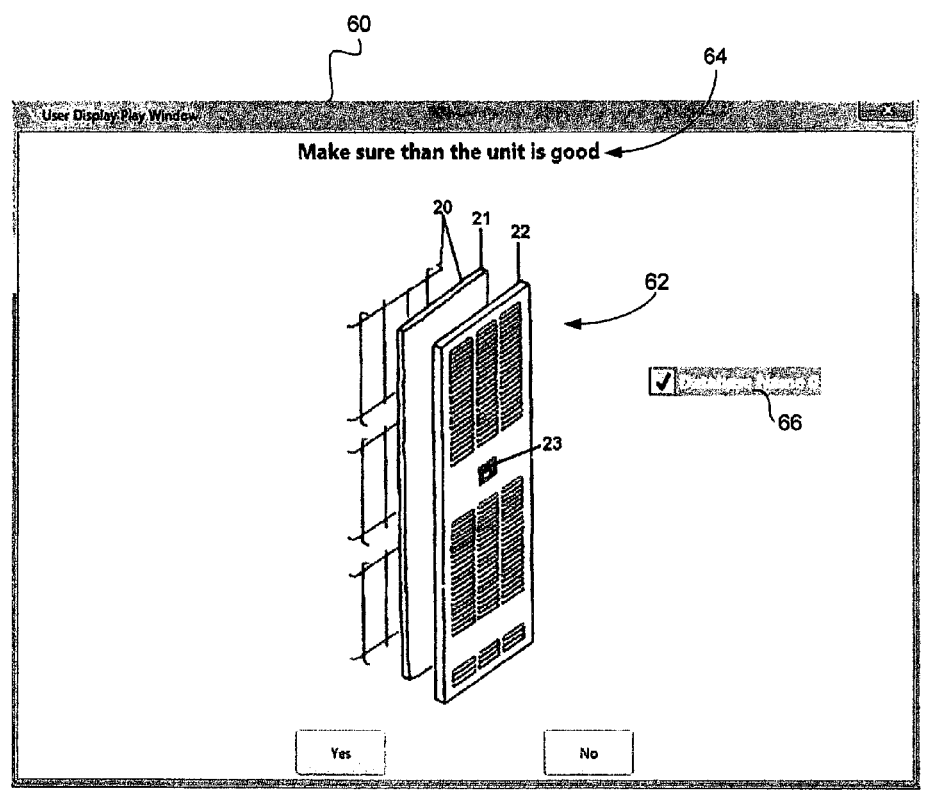
FIG. 5 shows a graphic user interface for the displaying of a check box smart icon using the process player tool.

For example, referring also to FIG. 4, check box icon (52c) allows the user to insert, using various editing tools (61), one or more image (62), text (64) and check boxes (66) that are to be displayed to a user running the process using the process player tool (36) (see FIG. 1). The images, text and check boxes can be used, for example, to indicate actions that are to be performed and how they are to be performed. Referring now to FIG. 5, the step resulting from the check box icon when the process is run through the process player tool (36) is displayed in a window (60) showing the image (62), text (64) and check box (66) for the user to click in order to indicate that the instructions have been followed and proper actions taken.

Referring back to FIG. 3, another example of smart icon (52) is the decision icon (52b) which allows, depending on a given result, to change direction in the process in order to perform a task associated to the given result.

The functionalities of the various smart icons (52) vary according to their type. Some further example of smart icons (52) include calculator icons, data retrieval icons, equipment control icons, user input icons, batch file or application launching icons, check list icons, file sharing icons, image grabbing icons, etc. The process builder tool (34) includes a graphic user interface for each type of smart icon (52) so that a user can simply specify the associated parameters.

Furthermore, the directional links (54) between the various smart icons (52) allow the execution of parallel threads using, for example, a branching icon (52b) that initiates parallel icon paths and a joining icon (52f), e.g. the three paths in FIG. 3 represented by smart icons (52b), (52c) and (52f) (first parallel path), icons (52b), (52d) and (52f) (second parallel path) and icons (52b), (52e) and (52f) (third parallel path).

When the user is done with the creation of the new process, or the editing of an existing one, the resulting code-less process is saved in the process database (12) (see FIG. 1) according to its process directory structure and becomes available through the process directory tool (32) to users having proper access rights.

Figure 8:
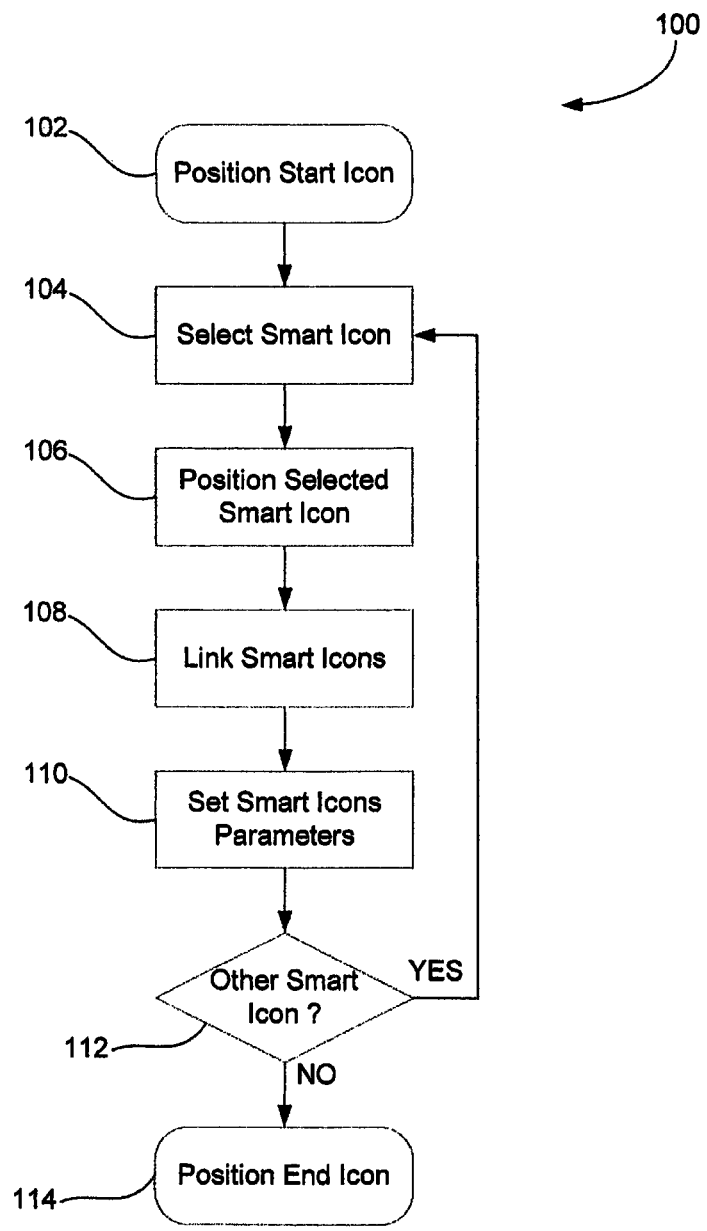
FIG. 8 shows a flow diagram of an illustrative example of the process building procedure.

Referring now to FIG. 8, there is shown a flow diagram of an illustrative example of the process building procedure (100) executed by the builder tool (34) when a user creates a new process. The steps of the procedure (100) are indicated by blocks (102) to (114).

The procedure (100) starts at block (102) where a user accesses the process builder tool (34). The process builder tool (34) presents, through a graphic user interface, a list of available smart icons, directional links and tools. To start the process the user selects the start icon and positions it within a designated process window in the graphic user interface.

Then, at block (104), the user selects a smart icon possessing desired characteristics and functionalities and, at block (106) places it in the process window, advantageously in a hierarchical position with regard to other icons representing functionalities that are to be performed prior to the present smart icon (though this is not obligatory).

At block (108), the newly position smart icon from block (106) is linked to at least one previously positioned icon using directional links provided by the graphic user interface of the process builder tool (34). The directional links represent the order in which the functionalities of the icons are to be performed.

At block (110), the parameters of the newly position smart icon from block (106) are set depending on the desired functionalities. For example, images and text may be added, an IP address specified for a test equipment, branching conditions specified, etc.

Then, at block (112), if other smart icons are to be added to the process, the procedure (100) proceeds back to block (104) where a new smart icon is selected. If no more smart icons are to be added, the procedure proceeds to block (114) where the user selects the end icon, places it and sets the appropriate directional links to previous icons in order to end the process.

After the process building procedure (100) is completed, the newly created process is stored in the process database (12) of the central server (10) and is made available to users through the process directory tool (32). It is to be understood that the user creating the new process may use the user manager tool (14) in order to set users' access rights to the new process, depending on the creating user's own rights on the unified process management system (1).

It is to be understood that in alternative embodiments of the process building procedure (100), the order of the various blocks may be changed. For example, the start, end and smart icons may all be chosen and positioned in a first step, then all of the directional links and parameters set afterwards.

Process Player Tool

Figure 6:
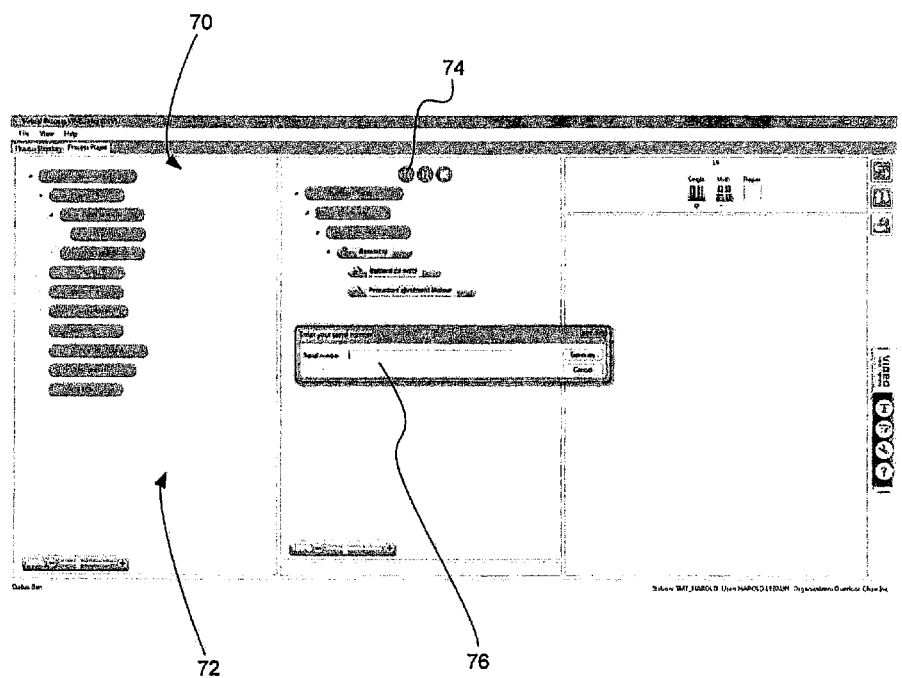
FIG. 6 shows a graphic user interface for the process player tool.

Referring to FIG. 6, the process player tool (36) (see FIG. 1) is used to run processes created by the process builder tool (34) through a graphic user interface (70). The user selects a process to be run from the list of available processes (72) and the corresponding process is imported from the process database (12) of the central server (10) (see FIG. 10). The user then simply presses the "play" button (74), enter a serial number or other identifier (76) and the process automatically starts. Alternatively, the serial number or identifier may be internally generated by a parametrizable. The serial number or identifier (76) is used to identify the various instances of the process which have been run. All of the results from the execution of the process along with the serial number or identifier (76) are stored, in real time, in the process database (12) on the central server (10).

Each time a process is run via the process player tool (36), the latter validates with the central server (10) that it possesses the latest version of the process and, if not, imports the latest version for execution.

The serial number or identifier, the smart icons information, individual execution time of the smart icons and total execution time of the process are stored in the process database (12) of the central server (10).

It is to be noted that the process player tool (36) uses the same interpreter as the process builder tool (34).

User Manager Tool

Figure 7:
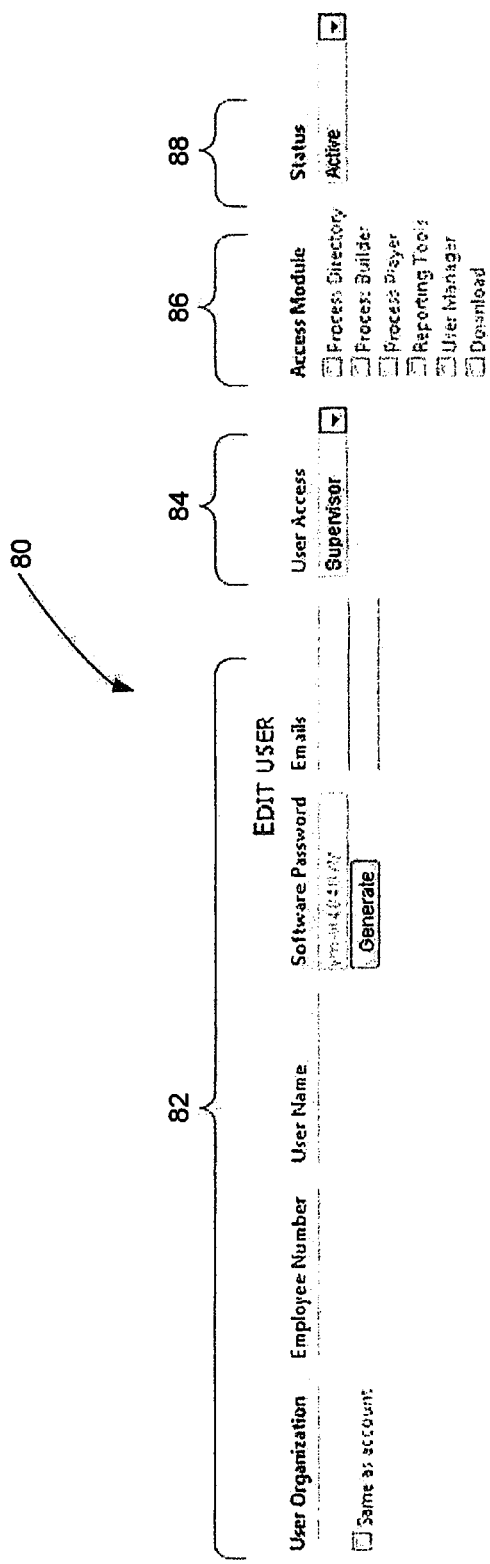
FIG. 7 shows graphic user interface for the user manager tool.

Referring to FIG. 7, the user manager tool (14) (see FIG. 1) is used to manage, through a graphic user interface (80), the access rights of users of the unified process management system (1), to processes stored in the process database (12) and to the various tools, i.e. process directory tool (32), process builder tool (34), process player tool (36), the reporting tool (16) and the user manager tool (14) itself.

The graphic user interface (80) includes a number of fields to input user information (82) such as user organisation, employee number, user name, password for the unified process management system (1) and emails. The graphic user interface (80) allows the setting of user access (84) to which specific access rights may be associated, permissions (86) indicating which modules, applications and/or tools may be used by the user, as well as a user status (88) for example to temporarily deactivate a user without deleting the user's information.

Reporting Tool

The reporting tool (16) (see FIG. 1) is used to collect the results of the processes run by the process builder tools (36), identified by their serial number or identifier (76) (see FIG. 6), and provide the information about the results and the processes in reports of various forms such as pie charts, tables, etc.

It should be noted that the unified process management system (1) enables transparent local operation in case of a communication failure with the central server (10) when the user is using the process player tool (36) and the desired process has been imported from the process database (12) of the central server (10) prior to the loss of communication. The process player tool (36) runs the imported process locally on the remote computer (30) and locally stores the process results until communication with the central server (10) is reestablished, at which time the results are transferred to the central server (10) and stored into the database (12).

As such, it is to be understood that the disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation. Hence, although the present invention has been described hereinabove by way of embodiments thereof, it can be modified, without departing from the spirit, scope and nature of the disclosure.

The invention claimed is:

1. A unified process management system, the system comprising:
    a server computer having a processor, a memory, and an associated process database, and further comprising programmable instructions stored in the memory and operating on the processor, the instructions adapted for storing processes;
    a process builder tool operating on a first remote computer comprising a graphic user interface providing a plurality of smart icons configured to be links indicating a workflow of linked smart icons each smart icon being of a predefined type having associated predefined functionalities and parameters, the functionalities being adaptable by setting the parameters, the graphic user interface allowing the user to graphically create or edit the process;
    wherein the process builder tool is configured to allow a user to create a new process or edit an existing process from the process database by linking at least two smart icons having associated functionalities using directional links and storing the newly created process or the edited existing process in the process database;
    wherein the links are directional links representing an order in which the predefined functionalities of the respective icons are to be performed;
    a process player tool operating on a second remote computer having a processor, a memory, and an associated process database, and further comprising programmable instructions stored in the memory and operating on the processor, the instructions adapted to executing a graphic user interface providing the list of available processes in the process database, the graphic user interface allowing the user to graphically select and execute the selected process and allowing the user to execute a selected process from a list of available processes in the database;
    wherein the first and second remote computers are configured to communicate with the server computer over a network;
    wherein the process player tool is configured to import the selected process from the process database and executes the imported process on the remote computer;
    wherein the process player tool is configured to store results from the execution of the imported process in the database; and,
    wherein the process player tool is configured to store results from the execution of the imported process in the second remote computer when communication with the server computer is lost and store the results in the database when communication with the server computer is reestablished.

2. The unified process management system of claim 1, wherein:
    the process builder tool operates on the server computer.

3. The unified process management system of claim 2, wherein the graphic user interface of the process builder tool allows a user to create a process having smart icons linked in parallel paths to be executed as parallel threads.

4. The unified process management system of claim 2, further including:
    a user manager tool located on the central server, the user manager tool including:
    a graphic user interface used to allow a user to manage access rights of system users to the unified process management system.

5. The unified process management system of claims 4, wherein the graphic user interface of the user manager tool allows a user to manage access rights of the system users to the processes stored in the database.

6. The unified process management system of claims 4, wherein the graphic user interface of the user manager tool allows a user to manage access rights of the system users to the tools located on the central server and on the remote computer.

7. The unified process management system of claim 1, further including:
    a process directory tool located on the first remote computer, the process directory tool including:
    a graphic user interface used to classify the processes in the database in a directory structure using a set of labels associated with each process.

8. The unified process management system of claim 7, wherein the labels include organization, version and process labels.

9. The unified process management system of claim 8, wherein the organization labels indicate an organizational structure of an enterprise.

10. The unified process management system of claim 8, wherein the version labels include a numerical counter automatically incremented each time one or more associated processes are edited wherein the numerical counter tracks the evolution of the processes.

11. The unified process management system of claim 10, wherein each version label includes a lock indicator indicating if the one or more associated processes can be edited or deleted.

12. The unified process management system of claim 8, wherein each process label identifies an associated process.

13. The unified process management system of claim 12, wherein each process label includes a mode indicator indicating if the associated process is available or unavailable.

14. The unified process management system of claim 1, wherein the smart icons further include associated user settable parameters.

15. The unified process management system of claim 1, wherein the smart icons include a start icon and an end icon.

16. The unified process management system of claim 1, wherein the functionalities of the smart icons are selected from a group consisting of calculator, data retrieval, equipment control, user input, batch file launching, application launching, check list, file sharing and image grabbing.

17. The unified process management system of claim 1, wherein the process player tool is configured so as to provide an identifier to be stored with the results from the execution of the imported process.

18. The unified process management system of claim 17, further including:
   a reporting tool located on the central server, the reporting tool being configured so as to provide reports about the results of the processes run by the process player tool as identified by their identifier respective.

* * * * *